UNITED STATES PATENT OFFICE.

CARLETON ELLIS, OF MONTCLAIR, NEW JERSEY.

HYDROGENATED-OIL COMPOSITION.

1,276,507.  Specification of Letters Patent.  Patented Aug. 20, 1918.

No Drawing. Application filed January 6, 1913, Serial No. 740,416. Renewed August 1, 1916. Serial No. 112,614.

*To all whom it may concern:*

Be it known that I, CARLETON ELLIS, a citizen of the United States, and resident of Montclair, in the county of Essex and State of New Jersey, have invented certain new and useful Improvements in Hydrogenated-Oil Composition, of which the following is a specification.

This invention relates to hydrogenated oil compositions adapted for use in the preparation of molded objects and for other purposes, and embraces the use not only of hydrogenated oil but other hardened oils of somewhat similar character.

Molded objects as usually made from waxes or resins or mixtures of these materials often show certain disadvantages, in the case of phonograph records some of the disadvantages which have been noted are those of not flowing readily when heated, or of not taking a good impression from the matrix, or of not giving a smooth polished article readily freed from air bubbles, or of decomposing badly in hot damp climates. The present invention at least so far as said records or similar material is concerned has for its object the preparation of products sufficiently or substantially free from these disadvantages, and for the attainment of this object I make use as a basis or blending homogenizing or protecting material, of hardened or hydrogenated oil, such for example as may be obtained by treating certain fatty oils with hydrogen or equivalent material in the presence of a catalytic body to effect a greater or less saturation of said fatty oils. In this manner a body is derived which has a very fine texture and yields a smooth hard surface and enables waxes and resins, metallic soaps and the like to be better blended or rendered more homogeneous as it were, often overcoming to a large degree a tendency to segregation or piping.

To this end I prepare a hydrogenated oil or fat as by treatment as aforesaid and carry the hydrogen addition to a high degree so as to produce bodies of relative high titre. Animal, fish or vegetable oils may be treated in this manner, including sperm, menhaden, cod and cod liver, porgy, whale, corn, almond, rape, castor, sesame, olive, soy bean, linseed, Chinese wood, mustard, cotton seed, tallow, lard and other oils and greases. A mixture of corn and cotton seed, castor and whale oils, or castor and cotton seed oil forms a desirable basis. Hydrogenation preferably should be carried to a point where the iodin number of the oil or oil mixture is reduced well below 50, preferably to an iodin number of 25 or less. This is desirable because by such extensive hydrogenation the oil may be freed from components having marked siccative or drying properties and because of the better blending effect secured in many cases. Instead of hydrogenating the oil may be treated to produce hydroxylated bodies or mixtures of hydrogenated and hydroxylated bodies and the like.

With the hydrogenated product may be incorporated waxes or resins or both, as well as filling materials in some cases. Similarly various metallic soaps may be incorporated. Suitable waxes for the purpose are hard paraffin, ceresin, ozocerite, Montan, candelilla, carnauba, shellac, Japan wax, and the like. Stearic acid also may be incorporated as well as the stearate soaps including those of sodium, zinc, lead, aluminum and other metals. Aluminum and calcium palmitate may be used, also the various resinates. Resins such as the copals, shellac, pontianak, rosin, dammar, sandarac, etc., may be employed. Pitches such as stearin pitch or candle tar are sometimes useful. Filling materials as barytes, terra alba, talc, clay and the like may be used in some instances also fibrous fillers as asbestos in some cases. The hydrogenated product as well as the other ingredients capable of combining with sulfur may be vulcanized for certain purposes.

Solid compositions suitable for making moldable articles such as phonograph records and the like may be prepared by melting and casting the following:—

Example 1: Hydrogenated corn oil 10 parts, sodium stearate 2 parts, stearic acid 5 parts and ceresin wax 3 parts.

Example 2: Hydrogenated fish oil having its iodin number reduced to 15, approximately 10 parts, hard paraffin 4 parts, ozocerite 3 parts, hydrogenated Montan wax 3 parts and lead stearate 1 part.

Example 3: Hydrogenated cotton seed oil having an acid titre of 59 or 60, approximately 10 parts, Montan wax, 2 parts, copal resin 5 parts, stearic acid 2 parts and pontianak rubber rosin 1 part.

Example 4: Hydrogenated cotton seed oil with an iodin number of 20-25, approximately 10 parts, asphalt 2 parts, stearin pitch 5 parts, ozocerite 12 parts.

Example 5: A mixture of equal parts hydrogenated castor and hydrogenated whale oil (iodin number of the mixture 30) and a like weight of ceresin.

Example 6: Hydrogenated cotton seed oil of iodin number 25 approximately 7 parts and hydrogenated castor oil of iodin number 20 approximately 6 parts, the melting point being finally adjusted if required by additions of stearic acid or ceresin.

Example 7: Hydrogenated cotton seed oil admixed in about equal proportions with hydrogenated corn oil (iodin number of the mixture 33) approximately 10 parts with suitable mineral filling material as talc 4 parts.

Example 8: A mixture of cotton seed oil 2 parts and whale or corn oil 1 part, the mixture being hydrogenated to a fatty acid titre of 60 or higher may be employed.

Hydroxylated oil may likewise be employed provided the iodin number is reduced until the characteristics desired in the foregoing are obtained. An oil of high iodin number often is unsatisfactory for the present purposes and in some instances highly detrimental. In particular it may be stated that the ability of some of the highly hydrogenated oils having a correspondingly low iodin number to melt rather sharply without a protracted stage of viscosity and the non-necessity of heating to relatively high temperatures to secure a suitable degree of liquidity or mobility is of utility in many compositions.

The expression "a waxy material" as used in the appended claims is intended to cover waxes, including ceresin, paraffin, ozocerite, carnauba; and equivalents thereof.

This application contains matter broadly disclosed, in the record of my copending application 808,461, viz.—mixtures of solid hydrogenated oil with waxy or resinous or pitchy materials.

I do not herein specifically claim the addition of solid mineral matter to the hydrogenated oil, this being claimed in my copending cases 163,738 filed Apr. 21, 1917 and 227,770, filed Apr. 10, 1918.

What I claim is:—

1. A composition of matter adapted for use as a sound record consisting, at least in part, of a moldable composition of matter comprising a hydogenated oil having a titre of not materially less than 59, together with a waxy material, said composition being solid at ordinary temperatures.

2. A composition of matter adapted for use as a sound record consisting, at least in part, of a moldable composition of matter comprising a hydrogenated oil of a titre of not materially less than 59, together with a wax and resinous matter.

3. A composition of matter adapted for use as a sound record consisting, at least in part, of a moldable composition of matter comprising a hydrogenated oil having a titre of not materially less than 59 and having an iodin number not exceeding 25, together with carnauba wax, said composition being solid at ordinary temperature.

4. A composition of matter solid at normal atmospheric temperatures, comprising a mixture including a hydrogenated oil and a wax.

5. A composition of matter solid at atmospheric temperatures, comprising a mixture including a hydrogenated oil, a waxy material and a resin.

6. A hydrogenated oil composition solid at normal atmospheric temperatures, consisting in part at least of hydrogenated oil solid at ordinary room temperature, incorporated with a substantial proportion of non-fatty organic solid material.

7. A hydrogenated oil composition solid at normal atmospheric temperatures, consisting in part at least of hydrogenated oil having a titre not materially below 59, incorporated with a substantial proportion of non-fatty material miscible with said hydrogenated oil.

8. A hydrogenated oil composition solid at normal atmospheric temperatures, comprising hydrogenated oil and paraffin wax.

Signed at Montclair in the county of Essex and State of New Jersey this 31st day of December A. D. 1912.

CARLETON ELLIS.

Witnesses:
B. M. ELLIS,
A. A. WELLS.